US006633583B1

(12) United States Patent
Esterson

(10) Patent No.: US 6,633,583 B1
(45) Date of Patent: Oct. 14, 2003

(54) WIRELESS UNIVERSAL SERIAL BUS RECEIVER

(75) Inventor: Clayton N. Esterson, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/215,756

(22) Filed: Dec. 18, 1998

(51) Int. Cl.[7] .................................................. H04J 3/22
(52) U.S. Cl. .................. 370/466; 370/463; 370/315; 370/338; 710/315; 710/106; 709/253
(58) Field of Search ................... 370/465, 466, 370/463, 469, 401, 402, 254, 255, 257, 338; 710/62, 63, 64, 315; 701/24; 709/253

(56) References Cited

U.S. PATENT DOCUMENTS

| | | | | |
|---|---|---|---|---|
| 5,787,259 A | * | 7/1998 | Haroun et al. .............. | 709/253 |
| 6,058,104 A | * | 5/2000 | Snelling et al. ............. | 370/277 |
| 6,067,583 A | * | 5/2000 | Gilbert ........................... | 710/8 |
| 6,081,533 A | * | 6/2000 | Laubach et al. ............ | 370/421 |
| 6,084,638 A | * | 7/2000 | Hare et al. ................... | 348/552 |
| 6,151,645 A | * | 11/2000 | Young et al. ................. | 710/63 |
| 6,219,730 B1 | * | 4/2001 | Nguyen ....................... | 710/62 |
| 6,282,082 B1 | * | 8/2001 | Armitage et al. ........... | 361/681 |
| 6,434,644 B1 | * | 8/2002 | Young et al. ................. | 710/63 |
| 2001/0014102 A1 | * | 8/2001 | Mattingly et al. .......... | 370/421 |

* cited by examiner

Primary Examiner—Dang Ton
Assistant Examiner—Tri H. Phan
(74) Attorney, Agent, or Firm—Jeffrey B. Huter

(57) ABSTRACT

In one embodiment of the present invention, a wireless USB architecture includes a transmitting device and a receiving device. The transmitting device includes a USB port to which a USB peripheral device can be connected, a conversion circuit for translating from USB protocol to RF protocol, and an RF transmitter for transmitting RF signals to the receiving device. The receiving device includes an RF receiver, a conversion circuit for translating from RF protocol to USB protocol, and a USB port which can be connected to the USB port of a computer.

19 Claims, 2 Drawing Sheets

WIRELESS UNIVERSAL SERIAL BUS RECEIVER

FIELD OF THE INVENTION

The invention relates to the field of computer architecture, and more particularly to the field of bus architecture for connecting peripheral devices to a computer.

BACKGROUND OF THE INVENTION

The Universal Serial Bus (USB) architecture, according to Universal Serial Bus Revision 1.1, released Sep. 28, 1998, provides a way to connect a peripheral device; such as a digital camera, a scanner, a keyboard, or a mouse, to a computer. According to standard USB architecture (Universal Serial Bus Specification Revision 1.0), the peripheral device is connected to the computer through a cable whose length does not exceed approximately fifteen feet. Power is supplied to the peripheral device from the computer through this cable.

For some applications, such as a security system having a digital camera in one room and a computer in another room, it is desirable to connect a peripheral device to a computer without using a cable having a maximum length of fifteen feet. Therefore, a wireless USB architecture has been developed.

SUMMARY OF THE INVENTION

A communication device is disclosed. The device includes a USB port and a radio frequency (RF) transmitter. The device also includes a USB protocol to RF protocol conversion circuit coupled between the USB port and the RF transmitter.

DETAILED DESCRIPTION OF A PREFERRED EMBODIMENT

A wireless Universal Serial Bus (USB) architecture is described. In the following description, specific details are set forth in order to provide a thorough understanding of the present invention. It will be apparent, however, to one skilled in the art that the invention can be practiced without regard to these specific details. In other instances, well known concepts have not been described in particular detail in order to avoid obscuring the present invention.

In one embodiment of the present invention, a wireless USB architecture includes a transmitting device and a receiving device. The transmitting device includes a USB port to which a USB peripheral device can be connected, a conversion circuit for translating from USB protocol to RF protocol, and an RF transmitter for transmitting RF signals to the receiving device. The receiving device includes an RF receiver, a conversion circuit for translating from RF protocol to USB protocol, and a USB port which can be connected to the USB port of a computer. This embodiment is illustrated in FIG. 1.

Unlike an approach using the standard USB architecture, an approach according to the present invention does not require that the peripheral device be connected to the computer by a cable with a maximum length of approximately fifteen feet. Instead, the peripheral device can be up to approximately 300 feet from the computer. Also, no cable between the computer and the peripheral device is required to supply power to the peripheral device.

Figure 1:
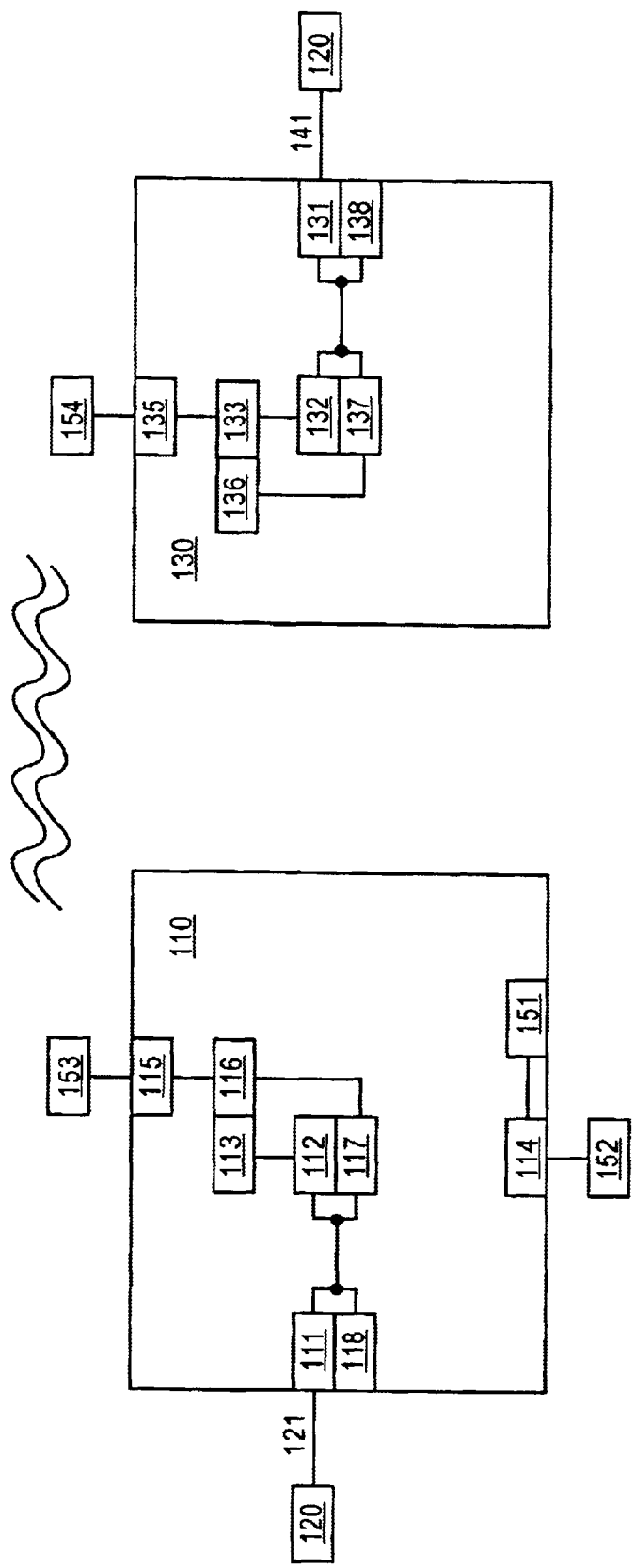
FIG. 1 is a block diagram illustrating an embodiment of the apparatus of the present invention.

Referring to FIG. 1, transmitting device 110 includes USB port 111, conversion circuit 112, and RF transmitter 113 to support the communication of information from peripheral device 120 to computer 140. Peripheral device 120 is connected to USB port 111 through USB cable 121 according to standard USB architecture. Peripheral device 120 can be any of a variety of peripheral devices, such as a digital camera, a scanner, a keyboard, or a mouse. Conversion circuit 112 is configured to translate packets of information from USB protocol to an RF protocol. Any of a variety of RF protocols, such as the well known 2.4 gigahertz (GHz) spread spectrum RF protocol, can be used. Conversion circuit 112 can be any of a variety of circuits, such as hardwired logic or an application specific integrated circuit, configured to translate packets of information from USB communication protocol to an RF protocol. RF transmitter 113 is configured to control the transmission of the RF signals corresponding to the information as translated to RF protocol by conversion circuit 112. RF transmitter 113 can be any device that sends out RF signals, and can use any of a variety of well known RF transmission techniques, such as frequency hopping.

Transmitting device 110 also includes power port 114 for supplying power to USB port 111, conversion circuit 112, and RF transmitter 113. Power port 114 is configured to receive power from one or more power sources, such as rechargeable, removable battery 151 and alternating current (AC) to direct current (DC) transformer 152.

Transmitting device 110 also includes antenna port 115, RF receiver 116 and conversion circuit 117 to support the communication of information from computer 140 to peripheral device 120. Any of a variety of RF antennas, such as 2.4 GHz RF antenna 153 can be connected to antenna port 115 to support the reception of RF signals. RF receiver 116 is coupled to antenna port 115 and configured to control the reception of RF signals according to any of a variety of RF transmission techniques. Conversion circuit 117 is configured to translate packets of information corresponding to the RF signals received through RF receiver 116 from RF protocol to USB protocol.

Transmitting device 110 can also include additional USB ports, such as USB port 118, to support the connection of additional peripheral devices to the computer.

Receiving device 130 includes antenna port 135, RF receiver 133, conversion circuit 132, and USB port 131 to support the communication of information from peripheral device 120 to computer 140. Any of a variety of RF antennas, such as 2.4 GHz RF antenna 154 can be connected to antenna port 135 to support the reception of RF signals. RF receiver 133 is connected to antenna port 135 and configured to control the reception of RF signals according to any RF transmission technique used by RF transmitter 113. Conversion circuit 132 is configured to translate packets of information corresponding to the RF signals received through RF receiver 131 from RF protocol to USB protocol. Computer 140 is connected to USB port 131 through USB cable 141 according to standard USB architecture.

Receiving device 130 also includes conversion circuit 137 and RF transmitter 136 to support the communication of information from computer 140 to peripheral device 120. Conversion circuit 137 is configured to translate packets of information from USB protocol to an RF protocol. RF transmitter 136 is configured to control the transmission of the RF signals corresponding to the information as translated to RF protocol by conversion circuit 137.

Receiving device 130 can also include additional USB ports, such as USB port 138, to support the connection of additional peripheral devices to the computer.

Figure 2:
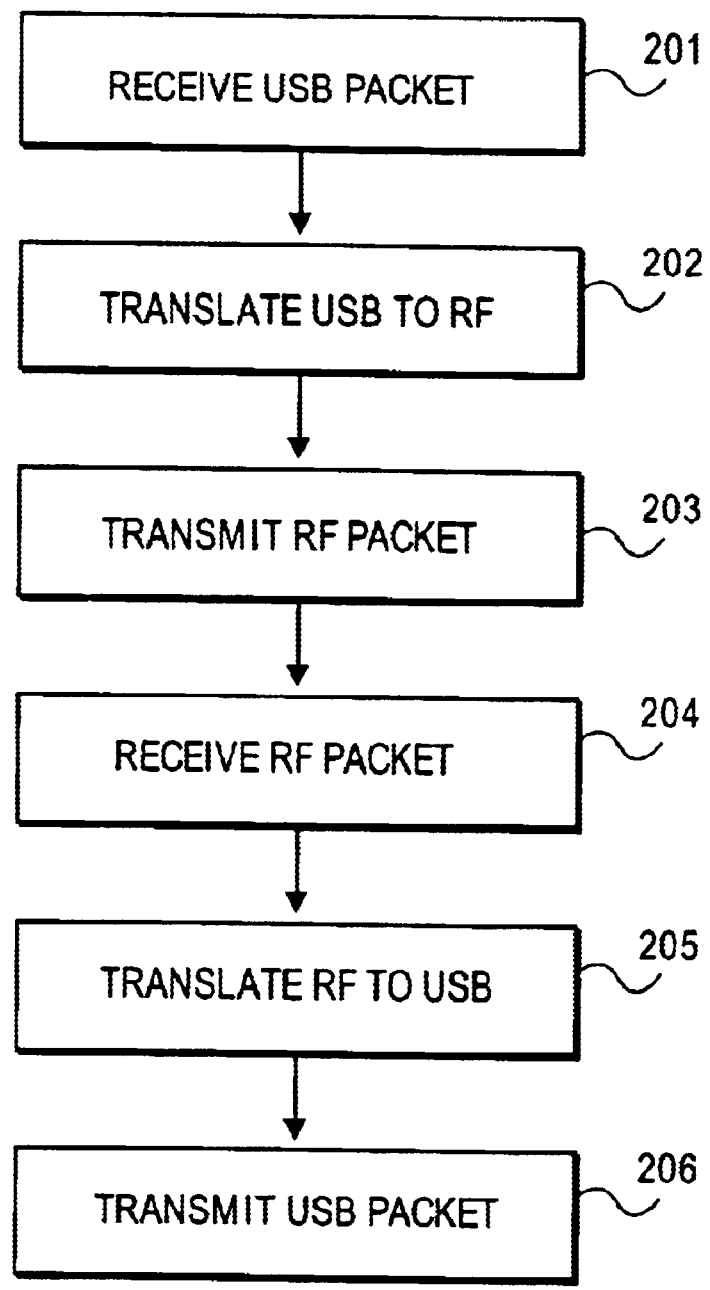
FIG. 2 is a flow chart illustrating an embodiment of the method of the present invention.

FIG. 2 is a flow chart illustrating one embodiment of the method of the present invention in the operation of the apparatus of FIG. 1. In step 201, transmitting device 110 receives a packet of information according to USB protocol from peripheral device 120 through USB port 111. In step 202, conversion circuit 112 translates the packet of information from USB protocol to an RF protocol, such as a 2.4 GHz spread spectrum protocol. In step 203, transmitting device 110 transmits the packet of information according to the RF protocol through RF transmitter 113.

In step 204 of FIG. 2, receiving device 130 receives the packet of information through RF antenna 154, antenna port 135, and RF receiver 133. In step 205, conversion circuit 132 translates the packet of information from RF protocol to USB protocol. In step 206, receiving device 130 transmits the packet of information according to USB protocol to computer 140 through USB port 131.

In another embodiment of the method of the present invention, receiving device 130 receives a packet of information according to USB protocol from computer 140 through USB port 131. Conversion circuit 137 translates the packet of information from USB protocol to an RF protocol, such as a 2.4 GHz spread spectrum protocol. Receiving device 130 transmits the packet of information according to the RF protocol through RF transmitter 136. Transmitting device 110 receives the packet of information through RF antenna 153, antenna port 115, and RF receiver 116. Conversion circuit 117 translates the packet of information from RF protocol to USB protocol. Transmitting device 110 transmits the packet of information according to USB protocol to peripheral device 120 through USB port 111.

Thus, exemplary embodiments of the present invention have been described. However, the present invention is not limited to these embodiments or any of the details described. The specification and drawings must be regarded in an illustrative rather than a restrictive sense. The scope of the present invention is defined by the following claims.

What is claimed is:

1. An apparatus to support wireless communications with a USB peripheral comprising
    a receiver to receive wireless signals,
    a first conversion circuit coupled to the receiver to convert the received wireless signals from a wireless protocol to USB signals having a USB protocol,
    a USB port to provide the USB peripheral with the USB signals generated by the first conversion circuit and to receive USB signals from the USB peripheral coupled to the USB port,
    a transmitter to transmit wireless signals having the wireless protocol,
    a second conversion circuit coupled to the transmitter to convert the USB signals received from the USB peripheral from the USB protocol to the wireless protocol to be transmitted by the transmitter,
    an antenna coupled the receiver and the transmitter via an antenna port to receive and transmit the wireless signals, and
    a power port to supply the apparatus with power from a battery power source.

2. The apparatus of claim 1, wherein the power port is to further supply the apparatus with power from an AC power source.

3. The apparatus of claim 1, wherein
    the first conversion circuit converts the wireless signals from a spread spectrum RF protocol to the USB protocol, and
    the second conversion circuit converts the USB signals from the USB protocol to the spread spectrum RF protocol.

4. The apparatus of claim 1, wherein
    the first conversion circuit converts the wireless signals from a 2.4 gigahertz spread spectrum RF protocol to the USB protocol, and
    the second conversion circuit converts the USB signals from the USB protocol to the 2.4 gigahertz spread spectrum RF protocol.

5. The apparatus of claim 1, wherein
    the first conversion circuit converts the wireless signals from a 2.4 gigahertz RF protocol to the USB protocol, and
    the second conversion circuit converts the USB signals from the USB protocol to the 2.4 gigahertz RF protocol.

6. The apparatus of claim 1, wherein the transmitter and the receiver perform frequency hopping transmissions of the wireless signals.

7. The apparatus of claim 1, wherein the battery power source powers the USB port and the USB peripheral via the power port.

8. A method of communicating between a computer and a USB peripheral comprising
    powering the USB peripheral via a battery power source of a first device,
    transmitting USB packets from the USB peripheral to the first device via a first USB cable,
    converting in the first device the USB packets to RF protocol packets,
    transmitting the RF protocol packets with an antenna of the first device,
    receiving the RF protocol packets with an antenna of a second device,
    converting in the second device the RF protocol packets to USB packets, and
    transmitting the USB packets from the second device to the computer via a second USB cable.

9. The method of claim 8, wherein
    converting in the first device comprises converting the USB packets to spread spectrum RF protocol packets, and
    converting in the second device comprises converting the spread spectrum RF protocol packets to USB packets.

10. The method of claim 8, wherein
    converting in the first device comprises converting the USB packets to 2.4 gigahertz spread spectrum RF protocol packets, and
    converting in the second device comprises converting the 2.4 gigahertz spread spectrum RF protocol packets to USB packets.

11. The method of claim 8, wherein
    converting in the first device comprises converting the USB packets to 2.4 gigahertz RF protocol packets, and
    converting in the second device comprises converting the 2.4 gigahertz RF protocol packets to USB packets.

12. The method of claim 8, wherein transmitting with the antenna of the first device and receiving with the antenna of the second device both comprise periodically hopping among frequencies to perform frequency hopping RF transmissions of the RF signals.

13. A system comprising
- a computer comprising a USB port,
- a first wireless communications device coupled to the USB port of the computer via a first USB cable to receive USB packets from the computer, the first wireless communications device to converter the USB packets to RF protocol packets and to transmit the RF protocol packets via an antenna of the first wireless communications device,
- a peripheral device comprising a USB port, and
- a second wireless communications device coupled to the USB port of the peripheral device via a second USB cable, the second wireless communications device to receive RF protocol packets via an antenna of the second wireless communications device, to convert the RF protocol packets to USB packets, to provide the peripheral device with the USB packets via the second USB cable, and to power the peripheral device via the second USB cable.

14. The system of claim 13, wherein the second wireless communications device comprises a battery that supplies power to the peripheral device through the second USB cable.

15. The system of claim 14, wherein the second wireless communications device further comprises a power port to receive power from the battery and to receive power from an AC power source via a transformer.

16. The system of claim 13, wherein
- the first wireless communications device converts USB packets to spread spectrum RF protocol packets, and
- the second wireless communications device converts spread spectrum RF protocol packets to USB packets.

17. The system of claim 13, wherein
- the first wireless communications device converts USB packets to 2.4 gigahertz spread spectrum RF protocol packets, and
- the second wireless communications device converts 2.4 gigahertz spread spectrum RF protocol packets to USB packets.

18. The system of claim 13, wherein
- the first wireless communications device converts USB packets to 2.4 gigahertz RF protocol packets, and
- the second wireless communications device converts 2.4 gigahertz RF protocol packets to USB packets.

19. The system of claim 13, wherein the first wireless communications device and the second wireless communications device perform frequency hopping RF transmissions of the RF protocol packets.

* * * * *